(12) United States Patent
Aharonson

(10) Patent No.: US 7,177,473 B2
(45) Date of Patent: Feb. 13, 2007

(54) HANDWRITING DATA INPUT DEVICE WITH MULTIPLE CHARACTER SETS

(75) Inventor: Eran Aharonson, Ramat Hasharon (IL)

(73) Assignee: Nuance Communications, Inc., Burlington, MA (US)

( * ) Notice: Subject to any disclaimer, the term of this patent is extended or adjusted under 35 U.S.C. 154(b) by 764 days.

(21) Appl. No.: 09/733,916

(22) Filed: Dec. 12, 2000

(65) Prior Publication Data

US 2002/0114516 A1    Aug. 22, 2002

(51) Int. Cl.
  *G06K 9/00*    (2006.01)
(52) U.S. Cl. .................................... 382/187
(58) Field of Classification Search ............ 382/209, 382/313, 314, 315, 321, 181, 186–189, 113; 345/179, 173, 169; 178/18.01, 18.03; 318/14.02, 318/14.03; 358/434, 435, 440, 462
See application file for complete search history.

(56) References Cited

U.S. PATENT DOCUMENTS

| | | | | | |
|---|---|---|---|---|---|
| 5,049,862 | A | * | 9/1991 | Dao et al. ................. | 345/179 |
| 5,467,407 | A | * | 11/1995 | Guberman et al. ......... | 382/186 |
| 5,526,411 | A | * | 6/1996 | Krieter ................. | 379/110.01 |
| 5,561,446 | A | * | 10/1996 | Montlick ................. | 345/173 |
| 5,587,560 | A | * | 12/1996 | Crooks et al. ............ | 178/18.03 |
| 5,659,633 | A | | 8/1997 | Ilan et al. | |
| 5,675,524 | A | * | 10/1997 | Bernard ................. | 708/109 |
| 5,864,636 | A | * | 1/1999 | Chisaka ................. | 382/189 |
| 5,959,260 | A | * | 9/1999 | Hoghooghi et al. ...... | 178/18.03 |
| 5,982,929 | A | | 11/1999 | Ilan et al. | |
| 6,023,529 | A | | 2/2000 | Ilan et al. | |
| 6,157,372 | A | | 12/2000 | Blackburn et al. | |
| 6,161,134 | A | * | 12/2000 | Wang et al. ............. | 709/220 |
| 6,177,950 | B1 | * | 1/2001 | Robb ................. | 348/14.01 |
| 6,289,213 | B1 | * | 9/2001 | Flint et al. .............. | 455/420 |
| 6,289,464 | B1 | * | 9/2001 | Wecker et al. ........... | 713/300 |
| 6,427,078 | B1 | * | 7/2002 | Wilska et al. ............ | 455/550.1 |
| 6,510,235 | B1 | * | 1/2003 | Shin et al. .............. | 382/100 |
| 6,661,920 | B1 | * | 12/2003 | Skinner ................. | 382/187 |
| 6,738,514 | B1 | * | 5/2004 | Shin et al. .............. | 382/187 |

* cited by examiner

*Primary Examiner*—Daniel Mariam
(74) *Attorney, Agent, or Firm*—Bromberg & Sunstein LLP

(57) ABSTRACT

A handwriting recognition input system including a handwriting input area and a plurality of activatable controls. Each activatable control is associated with a different reference library, and each is adapted to recognize characters input on the handwriting input area as belonging to the associated reference library. A method for handwriting recognition including the steps of selecting at least one character set from among a plurality of character sets and recognizing at least one character using the at least one selected character set.

5 Claims, 4 Drawing Sheets

HANDWRITING DATA INPUT DEVICE WITH MULTIPLE CHARACTER SETS

FIELD OF THE INVENTION

The present invention relates generally to the field of handwriting recognition and, more particularly, to handwriting data input devices that operate with multiple character sets.

BACKGROUND OF THE INVENTION

Handwriting recognition programs generally operate by comparing data generated from handwritten words or characters to stored recognition data (hereinbelow referred to as "reference library"). An attempt is made to correctly interpret the handwritten words or characters and to possibly display the recognized characters on a display device.

In order to increase recognition probability and to reduce computation time, some character recognition methods employ the splitting of the entire character set into a plurality of reduced character sets. Each reduced character set has a reference library and is associated with a specific input area of the digitizer pad. A number of commercially available products make use of this technology, associating one reference library with one input area and another reference library with another, separate input area. For example, in the Palm™ connected organizer series, commonly referred to as Palm Pilots (commercially available from Palm Inc., Santa Clara, Calif. USA), alphabetic characters are associated with the left part of the digitizer pad and numeric characters are associated with the right part.

SUMMARY OF THE INVENTION

There is provided, in accordance with an embodiment of the present invention, a handwriting recognition input system. The system includes a handwriting input area and a plurality of activatable controls. Each activatable control is associated with a different reference library and each is adapted to recognize characters input on the handwriting input area as belonging to the associated reference library.

Additionally, in accordance with an embodiment of the present invention, the plurality of activatable controls may include software controls, hardware controls, or a mix of software and hardware controls.

Further, in accordance with an embodiment of the present invention, the handwriting recognition input system includes at least one activatable menu control associated with a multiplicity of the activatable controls.

Furthermore, in accordance with an embodiment of the present invention, the handwriting recognition input system includes at least one activatable menu control associated with a multiplicity of other activatable menu controls.

Moreover, in accordance with an embodiment of the present invention, a personal digital assistant includes the handwriting recognition input system.

Still further, in accordance with an embodiment of the present invention, a mobile telephone includes the handwriting recognition input system.

There is provided, in accordance with an embodiment of the present invention, a handwriting recognition system that includes a plurality of activatable controls each associated with a reference library and a handwriting recognition unit for controlling handwriting recognition in accordance with an activated control.

Furthermore, in accordance with an embodiment of the present invention, the handwriting recognition system includes at least one activatable menu control associated with a multiplicity of the activatable controls.

Additionally, in accordance with an embodiment of the present invention, the handwriting recognition system includes at least one activatable menu control associated with a multiplicity of other activatable menu controls.

Moreover, in accordance with an embodiment of the present invention, a personal digital assistant includes the handwriting recognition system.

Still further, in accordance with an embodiment of the present invention, a mobile telephone includes the handwriting recognition system.

There is provided, in accordance with an embodiment of the present invention, a personal digital assistant including a housing, a handwriting input area mounted on the housing, and a plurality of activatable controls. Each activatable control is associated with a different reference library and is adapted to recognize characters input on the handwriting input area as belonging to the associated reference library.

There is provided, in accordance with an embodiment of the present invention, a personal digital assistant including a housing, a plurality of activatable controls each associated with a reference library, and a handwriting recognition unit mounted on the housing for controlling handwriting recognition in accordance with at least one activated control.

There is provided, in accordance with an embodiment of the present invention, a mobile telephone including a housing, a handwriting input area mounted on the housing, and a plurality of activatable controls. Each activatable control is associated with a different reference library and is adapted to recognize characters input on the handwriting input area as belonging to the associated reference library.

There is provided, in accordance with an embodiment of the present invention, a mobile telephone including a housing, a plurality of activatable controls each associated with a reference library, and a handwriting recognition unit mounted on the housing for controlling handwriting recognition in accordance with at least one activated control.

There is provided, in accordance with an embodiment of the present invention, a method for handwriting recognition including the steps of selecting at least one character set from among a plurality of character sets and is recognizing at least one character using the at least one selected character set.

There is provided, in accordance with an embodiment of the present invention, a method for handwriting recognition including the steps of associating a plurality of controls with a set of reference libraries, activating at least one of the controls, and recognizing characters input on a handwriting input area as belonging to the reference library associated with the at least one activated control.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

It is not always possible or desirable to use multiple input areas, especially for large numbers of reduced character sets or when the dimensions of the input area are small (as in cellular telephones for example). There exists a need for a system having one input area, yet employing a plurality of reduced character sets. Applicant has developed a handwriting recognition input unit using a single input area with the ability to recognize multiple character sets. This is accomplished with controls corresponding to specific reduced character sets. When controls are activated, their corresponding character sets are included in the set of characters to be recognized.

Figure 1:
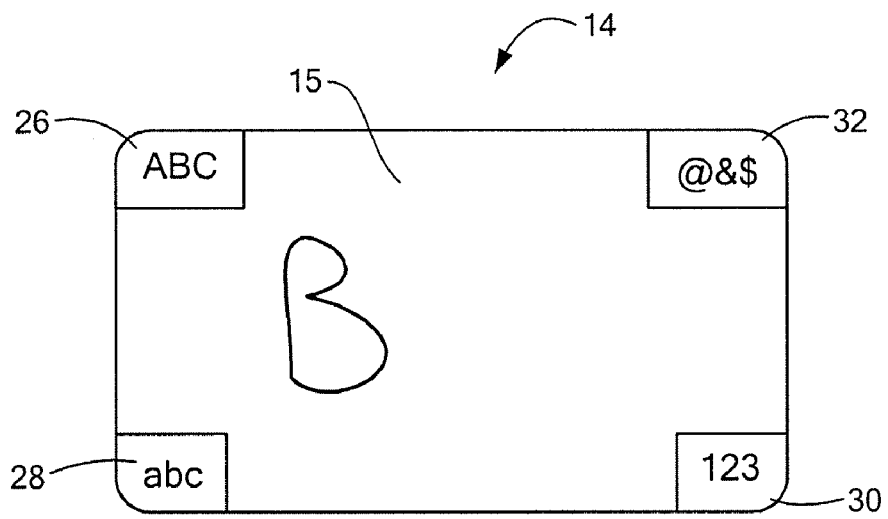
FIG. 1 is a schematic illustration of a handwriting recognition input unit (input unit), constructed and operative in accordance with an embodiment of the present invention.

Reference is now made to FIG. 1, which is a schematic illustration of a handwriting recognition input unit (input unit) 14, constructed and operative in accordance with an embodiment of the present invention. Input unit 14 comprises, in addition to an input area 16 of input unit 14, a plurality of controls 26, 28, 30, and 32.

Input unit 14 may be any type of input unit. Depending on the exact type of input unit, the controls may be integrated physically with input area 15 or may be physically separated. Furthermore, the controls may be software or hardware controls. Controls are activated and deactivated through the software or hardware user interface, for example by touching or pressing.

Software controls may be moved or relabeled interactively in addition to having their functionality changed. Though hardware controls may change function and in some embodiments be relabeled, they cannot be moved. This will be discussed further hereinbelow with respect to FIGS. 3 and 5.

In an embodiment of the present invention, input unit 14 may be for example a touch screen or a touchpad, both of which are responsive to applied pressure produced by a dedicated stylus or by a user's finger. For example, touch screens such as those used on Palm Pilot devices (commercially available from Palm Inc.), Pocket PC devices (such as the IPAQ Pocket PC H3600 device available from Compaq Computer Corporation, Houston, Tex., USA), and the Spiral (commercially available from Synaptics, Inc. San Jose, Calif. USA) may be used. An exemplary touchpad is the TouchWriter (also available from Synaptics, Inc.). Each control is responsive to a touch (pressure) of a stylus or a finger resulting in the activation of the corresponding operation mode.

In accordance with one embodiment of the present invention, there can be four operation modes. "Capital letters" operation mode is associated with control 26. In this operation mode, input alphabetical characters are recognized as capital letters even if they have been input as lowercase letters. If the user presses on lowercase control 28, the system will recognize the input characters as lowercase. Analogously, for recognizing numbers, the user must push "numeric" control 30. Afterwards, an input vertical line will be recognized as number "1" and not as a letter "i".

"Special" control 32 is activated so that the system will recognize special characters (such as $, &, @, {, }, . . . ) and punctuation marks.

Any recognized character is output or displayed as a character in the character set in which it was recognized. Furthermore, in an embodiment of the present invention, multiple controls may be active at once, for example controls 26 and 32, and hence any of the characters in the corresponding character sets could be recognized from an input character. Any appropriate handwriting recognition method known in the art can be used for character recognition. Exemplary methods are disclosed in U.S. Pat. Nos. 6,023,529, 5,982,929, and 5,659,633 (all to llan, et al.). If multiple character sets are active at once, handwriting recognition methods that can differentiate between ambiguous inputs must be used.

Figure 2:
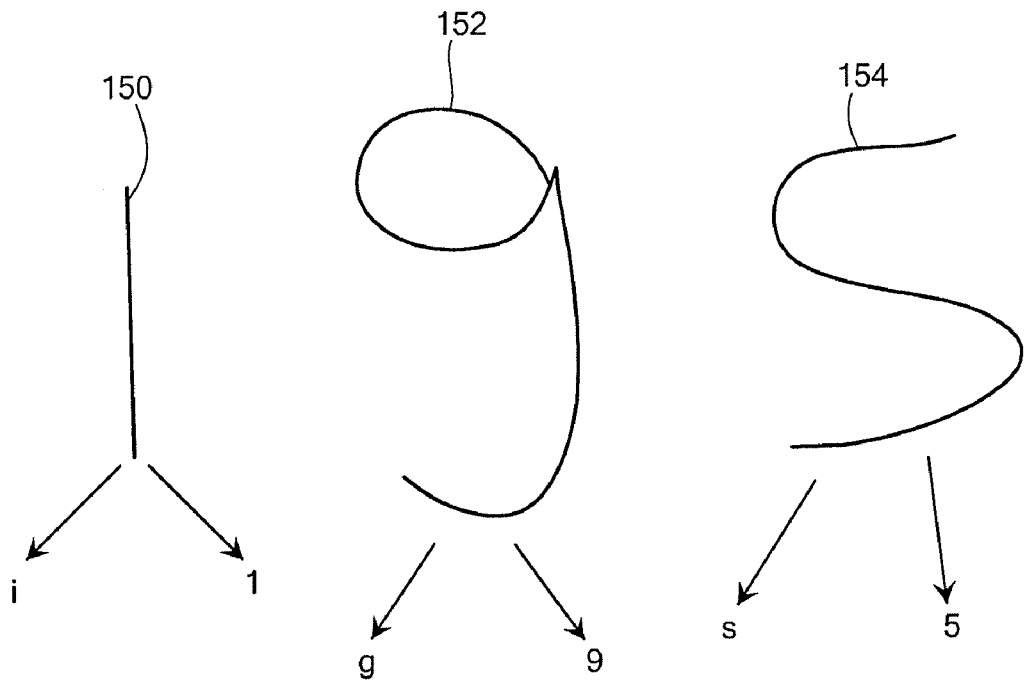
FIG. 2 is a schematic illustration of input strokes and their possible recognition values.

Reference is now made to FIG. 2, a schematic illustration of input strokes and their possible recognition values. Each of the controls 26, 28, 30, and 32 is associated with a different reference library, If, for example, "numeric" operation mode is active (via control 30), then input strokes 150, 152, and 154 shown in FIG. 2 will be recognized and output as numbers "1", "9", and "5", respectively. The same strokes would be recognized as letters "i", "g", and "s", respectively, when lowercase operation mode (via control 28) is active.

Figure 3:
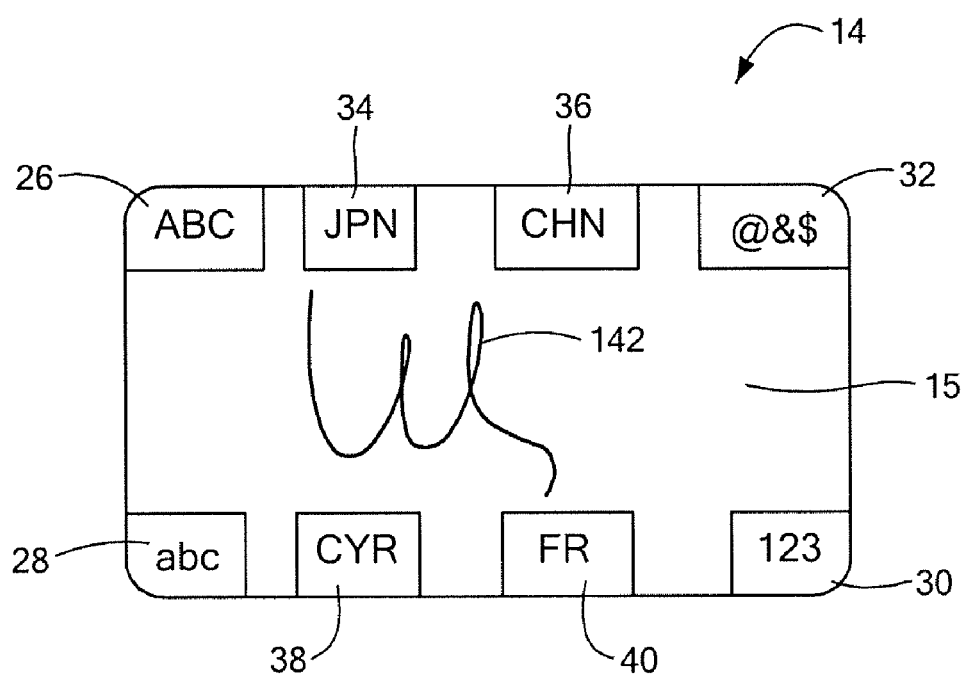
FIG. 3 is a schematic illustration of an alternative input unit to that of FIG. 1.
Figure 4:
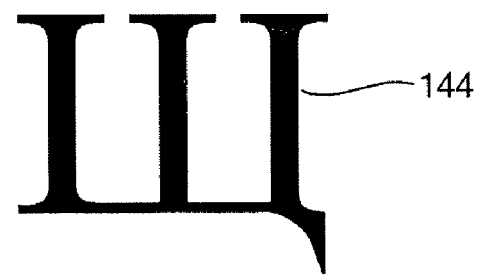
FIG. 4 is a schematic illustration of a Cyrillic letter.

Reference is now made to FIGS. 3 and 4. FIG. 3 is a schematic illustration of another input unit 14', constructed and operative in accordance with another embodiment of the present invention. Similar elements have similar reference numerals and will not be discussed further here. FIG. 4 is a schematic illustration of a Cyrillic letter.

In this embodiment, input unit 14' includes additional controls 34, 36, 38, and 40, which correspond to "Japanese", "Chinese", "Cyrillic", and "French" operation modes, respectively. Each of controls 34, 36, 38 and 40 is associated with a corresponding reference library. If the user wants to input a Cyrillic character, he has to activate "Cyrillic" mode via control 38 and then input the desired character. The input stroke will then be considered as one of the Cyrillic letters. For example, input stroke 142 will be recognized as Cyrillic letter 144 (FIG. 4).

Figure 5:
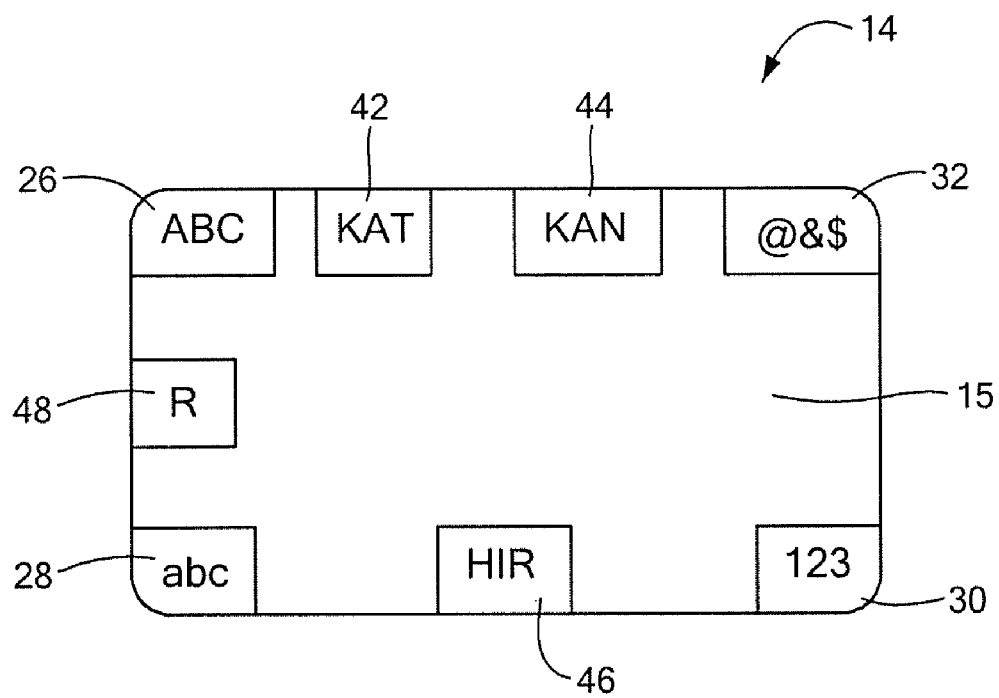
FIG. 5 is a schematic illustration of a further alternative input unit.
Figure 6:
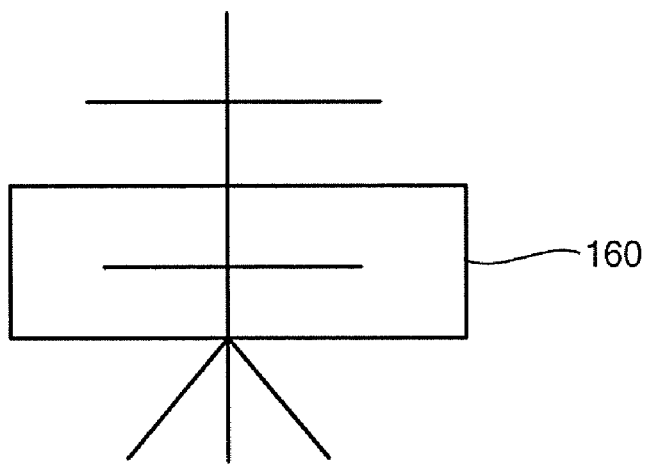
FIG. 6 is a schematic illustration of a Kanji character.

In a further embodiment of the present invention, the selection of a particular control causes input unit 14" to display different controls associated with that choice. This is illustrated in FIGS. 5 and 6, to which reference is now made. Selection of the "Japanese" operation made (by selection of control 34 in FIG. 3) causes controls 34, 36, 38, and 40 to be replaced with new controls. Controls 42, 44, and 46 correspond to Katakana, Kanji, and Hiragana character sets, respectively. Control 48 returns input unit 14" to input unit 14', the multi-language mode of FIG. 3.

The user selects the required operation mode according to the type of character he wants to input. For example, for correct recognition of character 160 (FIG. 6), the user should select control 44 (FIG. 5), which corresponds to the Kanji character set. To return to the multi-language window of FIG. 3, the user may select control 48.

Note that control 46 is in a different position on input area 15 than controls 38 and 40. This is possible because, in this case, software controls have been used.

As the components required to build a computer have been reduced in size, new categories of computers have emerged including, for example, hand-held computers or Personal Digital Assistants (PDAs) and mobile phones. PDAs are well known in the art and are often used to run Personal Information Management (PIM) applications, such as an address book, a daily organizer, a notebook, and the like. The present invention may be incorporated into any of these types of devices when recognition is to be performed.

Figure 7:
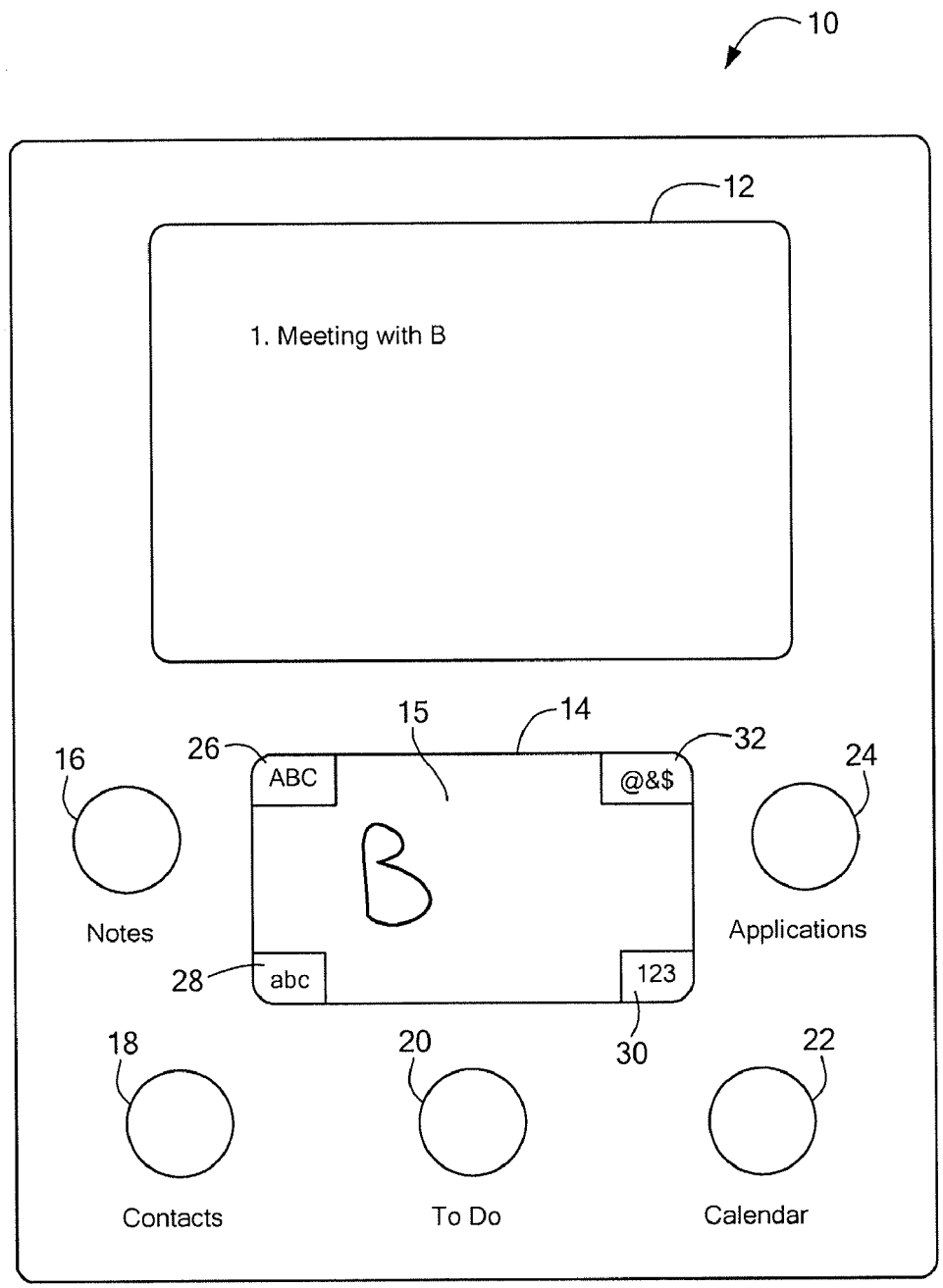
FIG. 7 is a schematic illustration of a Personal Digital Assistant incorporating an input unit such as that of FIGS. 1, 3, or 5, constructed and operative in accordance with an embodiment of the present invention.

Reference is now made to FIG. 7, which is a schematic illustration of the use of the present invention in a PDA 10, constructed and operative in accordance with an embodiment of the present invention. This embodiment is for illustrative purposes only and shows one possible use of the invention among many. PDA 10 includes an output unit 12, input unit 14, and exemplary PIM application buttons 16, 18, 20, 22, and 24. Output unit 12 can be an LCD display or any other output device. Input unit 14 is the same as in FIG. 1; similar elements have similar reference numerals and will not be discussed further here. It will be appreciated by persons skilled in the art that, instead of two separate input and output units (12 and 14), a single "input-output" unit can be used.

Exemplary PIM application buttons 16, 18, 20, 22, and 24 correspond to Notes, Contacts, To Do, Calendar, and Applications respectively. However, in another embodiment of the present invention they could be hardware controls as defined hereinabove. Input unit 14 in one embodiment of the invention may be a touch screen. However, input unit 14 may be any input unit as described generally in any of the embodiments hereinabove or in the claims.

Instead of using a keyboard, many PDAs employ a pen or stylus and a digitizer pad as an input system. Most of these PDAs provide some type of handwriting recognition system whereby the user can write words and letters on the digitizer pad with a pen or stylus. The PDA then converts the user's handwriting into a machine-readable format, such as ASCII code, which may be displayed when desired. Thus, input unit 14 of the invention is used as the input unit of the exemplary PDA of FIG. 7, Mobile telephones and similar devices also may possess similar handwriting input devices to be used instead of numeric buttons for data input. Furthermore, there exist other devices which may use handwriting input devices similar to input unit 14 for data input. It will be appreciated by persons skilled in the art that these devices are included within the scope of this invention.

These devices in the prior art often rely on multiple input areas to allow increased recognition probability and to reduce computation time. Input unit 14 may be used instead in such systems, replacing conventional handwriting input recognition units.

It will be appreciated by persons skilled in the art that the present invention is not limited by what has been particularly shown and described hereinabove. Rather the scope of the invention is defined by the claims that follow.

The invention claimed is:

1. A handwriting recognition input system comprising:
   a single handwriting input area; and
   a plurality of said input area is surrounded by activatable controls each being associated with a different reference library, and each configured to recognizing characters input on said handwriting input area as belonging to said associated reference library.

2. A handwriting recognition input system according to claim 1, wherein at least one of said plurality of activatable controls is a software control.

3. A handwriting recognition input system according to claim 1, wherein at least one of said plurality of activatable controls is a hardware control.

4. A personal digital assistant having a handwriting recognition input system according to claim 1.

5. A mobile telephone having a handwriting recognition input system according to claim 1.

* * * * *